United States Patent [19]

Reeder

[11] Patent Number: 4,776,657
[45] Date of Patent: Oct. 11, 1988

[54] ELECTRO-OPTIC PHASE SHIFTER WITH REDUCED INPUT CAPACITANCE

[75] Inventor: Thomas M. Reeder, Portland, Oreg.

[73] Assignee: Tektronix, Inc., Beaverton, Oreg.

[21] Appl. No.: 844,038

[22] Filed: Mar. 25, 1986

[51] Int. Cl.⁴ .......................... G02B 6/10; G02F 1/00
[52] U.S. Cl. ............................... 350/96.14; 350/96.13
[58] Field of Search ................ 350/96.13, 96.14, 96.15

[56] References Cited

U.S. PATENT DOCUMENTS

| | | | |
|---|---|---|---|
| 4,070,094 | 1/1978 | Martin | 350/96.14 |
| 4,251,130 | 2/1981 | Marcatili | 350/96.14 |
| 4,288,785 | 9/1981 | Papuchon et al. | 350/96.14 X |
| 4,340,272 | 7/1982 | Papuchon et al. | 350/96.14 |
| 4,618,210 | 10/1986 | Kondo | 350/96.14 |

FOREIGN PATENT DOCUMENTS 52-32347  3/1977  Japan .................................. 350/96.14

*Primary Examiner*—John Lee
*Attorney, Agent, or Firm*—John Smith-Hill; Robert S. Hulse

[57] ABSTRACT

An optical phase shifter comprises an optical waveguide of electro-optic material and an electrode structure associated with the waveguide for imposing an electrical field on the waveguide. The electrode structure comprises at least two groups of electrodes, each group having at least first and second electrodes between which the waveguide passes. The first electrode of one group and the second electrode of the other group are on opposite respective sides of the waveguide and are connected to respective input terminals for receiving an electrical signal. The second electrode of the one group is connected to the first electrode of the other group.

4 Claims, 1 Drawing Sheet

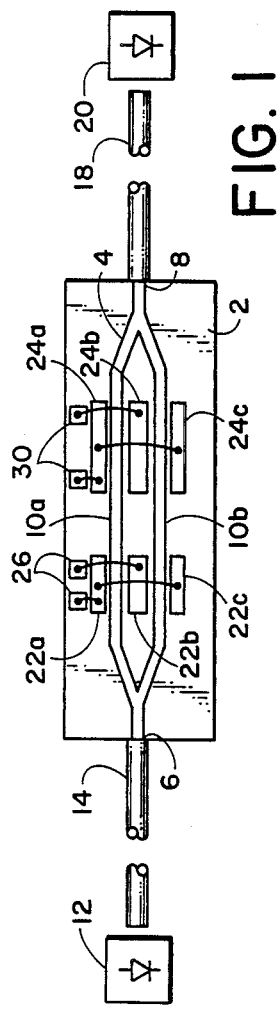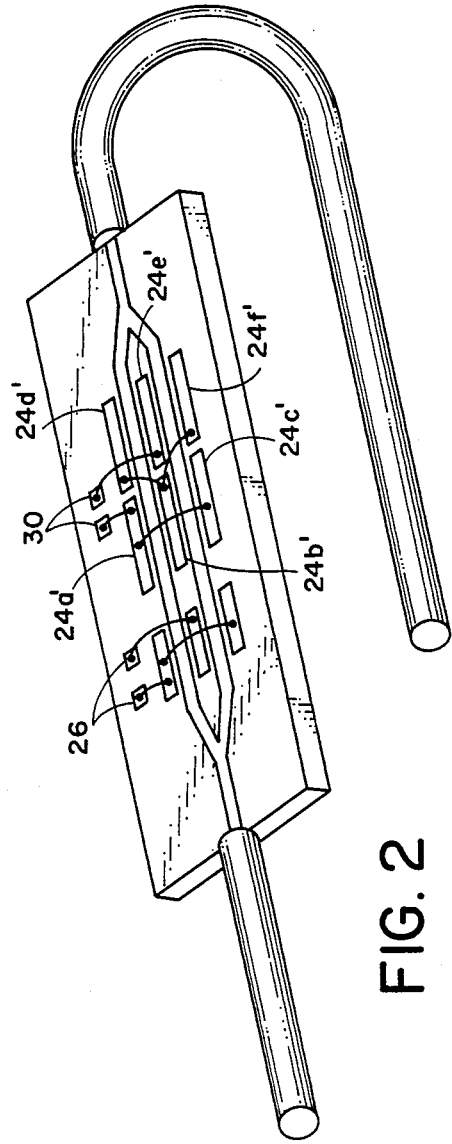

ELECTRO-OPTIC PHASE SHIFTER WITH REDUCED INPUT CAPACITANCE

This invention relates to an electro-optic phase shifter with reduced input capacitance.

BACKGROUND OF THE INVENTION

The velocity of light in an electro-optic (EO) material, such as lithium niobate, depends upon the electric field in the material. This effect is utilized in the Mach-Zehnder integrated optic voltage-to-optical-amplitude modulator, one form of which is described in F. J. Leonberger, Optics Letters, 5, 312 (1980). The device described by Leonberger is fabricated on a substrate of X-cut lithium niobate with waveguide propagation in the Y direction. Electrodes are spaced across a branch of the waveguide in the Z direction, so as to impose an electric field in the Z direction on the waveguide material. The relationship between the crystal axes of the lithium niobate and the direction of the electric field is such that a significant EO effect is obtained on light traveling in the direction of waveguide propagation.

A somewhat more complex interferometer is shown in FIG. 1 of the accompanying drawings. The modulator shown in FIG. 1 comprises a substrate 2 of crystalline EO material on which is formed an optical waveguide 4. The waveguide extends between an input end 6 and an output end 8, and is divided into two parallel branches 10a and 10b. The waveguide is coupled at its input end by a single mode optical fiber 14 to a laser source 12, including a laser diode, and is coupled at its output end by a single mode fiber 18 to an optical detector 20, including a photodiode. The substrate 2 carries a bias electrode structure comprising electrodes 22a, 22b and 22c and an interferometer electrode structure comprising electrodes 24a, 24b and 24c. Each of the electrode structures forms two capacitors connected in parallel, with the two branches of the waveguide electrically stressed by the fields in the two capacitors respectively. The bias electrodes 22 are connected to a variable DC bias source, by way of terminals 26, whereas the interferometer electrodes 24 are connected to a source of a signal to be measured, such as a logic analyzer probe, by way of terminals 30. It can be seen that the two branches 10a and 10b are subjected to equal and opposite electric fields by each of the electrode structures. The orientation of the electric fields established by means of electrodes 22 and 24 relative to the crystal axes of the selected EO material is such that a significant EO effect is obtained on light traveling in the direction of waveguide propagation.

The phase of light leaving one of the branches 10a and 10b depends upon the integral with respect to distance of the electric field to which the branch is exposed. If the electric field is uniform over the length of each electrode structure, the portion of this integral that is attributable to each electrode structure is equal to the product of the length of the electrode structure times the electric field. Since the two waveguide branches are exposed to equal and opposite electric fields by each of the electrode structures, a differential phase shift $\phi_B$ occurs between the branches 10a and 10b due to the bias electrodes 22 and a differential phase shift $\phi_P$ occurs due to the interferometer electrodes 24. The phase shifts $\phi_i$ are related to the applied voltages $V_i$ by $\phi_i = K_i L_i V_i$, where $K_i$ is a constant that is dependent upon the electro-optic properties of the substrate and on the electrode structure and $L_i$ is the electrode length in the light propagation direction. It can be shown that the optical intensity $I_{out}$ at the output end 8 is related to the intensity $I_{in}$ at the input end 6 by:

$$I_{out} = I_{in}[1 + \cos(\phi_B + \phi_P)]/2 \tag{1}$$

By appropriate selection of $L_B$ and adjustment of $V_B$, $\phi_B$ can be made equal to 270°, so that $$I_{out} = I_{in}(1 + \sin \phi_P)/2 \tag{2}$$

Therefore, the voltage output of the photodetector 20, which is a function of $I_{out}$, is a measure of the probe voltage $V_P$.

Since the phase shift $\phi_P$ is proportional to $L_P V_P$, it is possible to increase the voltage sensitivity $\phi_P V_P$ by increasing the length $L_P$ of the interferometer electrode structure. However, the input capacitance $C_P$ of the interferometer electrode structure is proportional to $L_P$. Therefore, if $L_p$ is increased the input capacitance $C_P$ also increases. Since the bandwidth of the signals that can be sensed is inversely proportional to the input capacitance $C_p$, an increase in $L_P$ causes a reduction in bandwidth of the interferometer electrode structure.

SUMMARY OF THE INVENTION

A preferred optical phase shifter embodying the present invention comprises an optical waveguide of EO material, and an electrode structure associated with the waveguide for imposing an electrical field on the waveguide in response to an electrical signal applied to two input terminals of the phase shifter. The electrode structure comprises at least two groups of electrodes, each group of electrodes having at least first and second electrodes between which the waveguide passes. The first electrode of one group and the second electrode of the other group are on opposite respective sides of the waveguide and are connected to the two input terminals respectively. The second electrode of the one group is coupled to the first electrode of the other group.

BRIEF DESCRIPTION OF THE DRAWINGS

For a better understanding of the invention, and to show how the same may be carried into effect, reference will now be made, by way of example, to the accompanying drawings in which:

FIG. 1 is a schematic perspective view of an amplitude modulator of conventional construction, FIG. 2 is a view similar to FIG. 1 of an amplitude modulator embodying the present invention, FIG. 3 is a graph illustrating the transfer function of the FIG. 2 modulator, FIG. 4 is a block diagram of a probe system incorporating the FIG. 2 modulator, and FIG. 5 illustrates schematically a development of the FIG. 2 modulator.

In the different figures, like reference numerals indicate corresponding elements.

DETAILED DESCRIPTION

In the modulator shown in FIG. 2, the interferometer electrodes 24a'-24f' are segmented so as to provide two groups of segments of substantially equal length and the different segments are connected together so that the two capacitors formed by the electrodes between which a waveguide branch 10a or 10b passes are connected in series. Thus, for example, the capacitor formed by the electrodes 24a' and 24b' is connected in series with the capacitor formed by the electrodes 24d' and 24e'. If the electrodes 24' of the FIG. 2 modulator are each of the same length as the electrodes 24 of the FIG. 1 modulator, and each pair of adjacent electrodes are at the same spacing, then the capacitance of each capacitor of the interferometer electrode structure of FIG. 2 is the same as the capacitance of each capacitor of the interferometer electrode structure of FIG. 1. However, owing to the series connection of the capacitors the input capacitance $C_P'$ of the interferometer is half the input capacitance of the interferometer electrode structure of the FIG. 1 modulator. Because of the series connection, the field to which each waveguide is exposed in the interferometer electrode structure is halved with respect to the structure shown in FIG. 1, but since the length of the interferometer electrode structure of FIG. 2 is doubled with respect to that of FIG. 1, the product of length times electric field, and consequently the voltage sensitivity of the interferometer electrode structure, remains the same. Alternatively, if the overall length of the interferometer structure remains the same as in FIG. 1, so that each of the electrodes $24a'-24f'$ of FIG. 2 is half the length of the electrodes $24a-24c$ of FIG. 1, the voltage sensitivity is halved but the signal bandwidth is doubled.

Experimental data indicate that an interferometer electrode structure of the kind shown in FIG. 2, using lithium niobate waveguides 4–10 μm wide and interferometer electrodes 2–6 mm long, has a 0.4–0.6 pF input capacitance and a parallel resistance of 5–20 kohms, and is able to sense signals with a dynamic range of 4 volts and having a bandwidth of 1.5 GHz.

Use of the modulator in a probe system is illustrated in FIG. 4. The source 12 is a pulsed laser source and it is caused by a clock generator 50 to generate light pulses at a frequency $f_c$, corresponding to a period $T_c$. The light pulses are coupled through the input fiber 14 to the modulator, designated 54, and the light output of the modulator is coupled through the fiber 18 to the detector 20. The detector 20 provides an output voltage $V_D$ proportional to the optical power received by way of the fiber 18, and the voltage $V_D$ is converted to digital form using an analog-to-digital converter (ADC) 56 which samples the voltage $V_D$ under control of the clock generator 50. The multiple-bit output signal of the ADC 56 is processed, for example, in order to provide a display representing the variation as a function of time of the voltage $V_P$. In order to compensate for the sinusoidal relationship between the output power $I_{out}$ and the phase shift $\phi_P$ (FIG. 3), and provide a suitable offset, the output signal of the ADC 56 may be linearized using a PROM look-up table (not shown).

It will be appreciated that the present invention is not restricted to the particular voltage-to-optical-amplitude modulator that has been described with reference to FIG. 2, and that variations may be made therein without departing from the scope of the invention as defined in the appended claims and equivalents thereof. For example, by dividing the interferometer electrode structure into three or more segments, as shown in FIG. 5, the capacitance of the interferometer electrode structure, for a given aggregate electrode length, may be reduced still further. The number of segments having series-connected electrodes can be increased, and the input capacitance of the electrode structure will be reduced, so long as the length of each segment is much greater than the width of the gap in which the waveguide lies, so that end effect parasitic elements such as spurious capacitance, remain very small.

I claim:

1. An optical phase shifter comprising first and second input terminals for receiving an electrical signal, an optical waveguide of electro-optic material, and an electrode structure associated with the waveguide for imposing an electrical field on the waveguide, said electrode structure comprising at least two groups of electrodes, each group having at least first and second electrodes between which the waveguide passes, the first electrode of one group and the second electrode of the other group being on opposite respective sides of the waveguide and being connected to the first and second input terminals respectively, and the second electrode of said one group being connected to the first electrode of said other group.

2. An optical phase shifter according to claim 1, wherein the waveguide defines two parallel branches and each group of electrodes in the electrode structure has first, second and third electrodes, one branch of the waveguide lying between the first and second electrodes and the other branch lying between the second and third electrodes, and wherein the first input terminal of the phase shifter is connected to the first and third electrodes of one group and the second input terminal is connected to the second electrode of the other group, and the second electrode of said one group is connected to the first and third electrodes of said other group, whereby light passing through the two branches undergoes equal and opposite phase shifts.

3. An optical phase shifter according to claim 2, wherein the number of groups of electrodes is two.

4. An optical phase shifter according to claim 2, further comprising a bias electrode structure having first and second input terminals and first, second and third electrodes, one branch of the waveguide passing between the first and second electrodes of the bias electrode structure and the other branch of the waveguide passing between the second and third electrodes thereof, the first input terminal of the bias electrode structure being connected to the first and third electrodes thereof and the second input terminal of the bias electrode structure being connected to the second electrode thereof.

* * * * *